United States Patent [19]

Hoerner

[11] Patent Number: 5,211,369
[45] Date of Patent: May 18, 1993

[54] SPRUNG SEAT FRAME FOR A SEAT

[75] Inventor: Josef Hoerner, Regensburg, Fed. Rep. of Germany

[73] Assignee: Grammer AG, Amberg, Fed. Rep. of Germany

[21] Appl. No.: 915,457

[22] Filed: Jul. 16, 1992

[30] Foreign Application Priority Data

Jul. 19, 1991 [DE] Fed. Rep. of Germany ....... 4123968
Apr. 22, 1992 [DE] Fed. Rep. of Germany ....... 4213206

[51] Int. Cl.[5] ............................................. F16M 13/00
[52] U.S. Cl. .................................... 248/588; 248/620; 267/173
[58] Field of Search ............... 248/588, 620, 575, 594; 267/173, 174, 175; 188/380; 297/345, 304

[56] References Cited

U.S. PATENT DOCUMENTS

| 4,072,287 | 2/1978 | Swenson | 248/588 X |
| 4,295,627 | 10/1981 | Graves | 297/304 X |
| 4,312,491 | 1/1982 | Aondetto | 248/575 |
| 4,611,783 | 9/1986 | Sakamoto | 248/594 X |
| 4,659,052 | 4/1987 | Nagata | 248/575 |
| 4,673,170 | 6/1987 | Dykema | 188/380 X |
| 4,729,539 | 3/1988 | Nagata | 108/136 X |

FOREIGN PATENT DOCUMENTS

| 737621 | 12/1932 | France | 248/588 |
| 264928 | 5/1970 | U.S.S.R. | 248/588 |

Primary Examiner—J. Franklin Foss
Attorney, Agent, or Firm—Elliot M. Olstein; Raymond J. Lillie

[57] ABSTRACT

A sprung seat frame for a seat comprises a seat plate for carrying for example upholstery and a base plate for mounting the seat for example on a motor vehicle floor. A scissor-type lever assembly comprising first and second levers which cross and are pivotally connected together is operatively disposed between the seat plate and the base plate. A seat frame springing system includes a compression spring disposed between the lever assembly and the base plate. To produce a softer spring characteristic than would otherwise correspond to the spring characteristic of the compression spring, the seat frame includes a correction spring which is operatively arranged between the two levers at least approximately parallel to the seat and base plates so that upon sprung downward movement of the seat plate the correction spring moves from a position above the pivotal interconnection of the levers to a position beneath the interconnection.

6 Claims, 1 Drawing Sheet

SPRUNG SEAT FRAME FOR A SEAT

BACKGROUND OF THE INVENTION

One form of sprung seat frame for a seat such as for use in a motor vehicle, as can be found in DE 30 42 604 C2, comprises a base plate which for example can be secured to the floor of a motor vehicle, and a seat plate which can receive for example the seat upholstery. Disposed between the seat and base plates is a scissors-type frame assembly comprising first and second levers which are pivotally connected together in their central region in a crossed or scissor-like configuration. The levers are each connected by respective end portions to the base plate and the seat plate respectively, one end being pivotally connected to the respective plate and the other end being connected to the respective plate in such a way as to be linearly movable in relation thereto on a suitable guide means provided on the respective plate. A springing system including a compression spring is operatively disposed between the lever assembly and the base plate, to provide for springing of the seat frame.

As a result of the small amount of space available for accommodating the compression spring between the lever assembly and the base plate, such a seat frame structure can use only a relatively compact spring. However a compact spring of that kind has a high spring rate, thus generally resulting in a seat frame which has hard springing characteristics.

In terms of a springing system, reference may be made to DE 35 17 345 C2 disclosing a springing arrangement comprising a coil tension spring and a member which acts thereon. The non-linear dependency of the spring force on the distance covered by said member is not only dependent on the spring rate of the coil spring but is also adjustable by said member itself. Furthermore, in general terms of springing, reference may be made to German patent specification No 943 171 disclosing progressive springing for rail vehicles by means of a spring band composed of a plurality of spring wires or thin-gauge blade members.

SUMMARY OF THE INVENTION

An object of the present invention is that of providing a sprung seat frame for a seat which in spite of the use of a relatively hard compression spring to provide a springing action, has overall a relatively soft springing characteristic.

Another object of the present invention is to provide a sprung seat frame which can afford an improved degree of seating comfort as well as enhancing the service life of the springing system.

Still another object of the present invention is to provide a sprung seat frame for a motor vehicle seat which is of a compact structural configuration while nonetheless providing a good level of seating comfort by virtue of a suitable spring rate in the seat springing system.

In accordance with the present invention, the foregoing and other objects are attained by a sprung seat frame for a seat, such as a vehicle seat, comprising a base support means, a seat support means for carrying for example upholstery, and first and second levers disposed between the seat support means and the base support means and pivotally connected together in the central region in a scissor-like frame configuration. The seat frame further includes first means connecting the first end portions of the levers to the base support means and second means connecting the second end portions of the levers to the seat support means, one of the first and second connecting means being a pivotal connection between the associated lever and the respective support means and the other of said first and second connecting means comprising a sliding guide means adapted to provide for linear movement of the associated lever relative to the respective support means. A springing system includes a compression spring disposed between the scissor-type frame configuration and the base support means, for springing the seat frame. A correction spring is operatively arranged between the levers in at least approximately parallel relationship to the base and seat support means in such a way that upon movement of the seat support means relative to the base support means the correction spring is displaceable relative to the pivotal connection location between the levers, whereby there is a change in the component of the spring force of the correction spring, which component is parallel to the spring force of the compression spring. The change in said spring force component may be a change in the direction of the spring force component. That results in a change in the spring rate of the springing system of the seat frame.

As will be seen in greater detail hereinafter with reference to a preferred embodiment of the sprung seat frame according to the invention, as the pivotal connection location between the first and second levers, upon any vertical movement of the seat support means, performs a movement in a vertical direction which is only half as great as the corresponding vertical movement of the seat support means, when the correction spring is appropriately arranged it is possible for the correction spring to move downwardly from a position above the pivotal connection location between the levers, through that location, to a position below that location. In that connection, the force applied by the correction spring to the sprung seat frame is added to the force of the compression spring as long as the correction spring is above the pivotal connection location between the levers. If the correction spring is disposed virtually precisely at the pivotal connection location, that gives a neutral operating condition in which it is only the spring force of the compression spring that is operative to provide for springing of the seat frame structure. If the correction spring is in a position beneath the pivotal connection location, then the correction spring applies to the seat frame structure a force having a vertical component which is in opposite relationship to the spring force applied to the seat frame structure by the compression spring. Overall that consequently provides a sprung seat frame having a springing characteristic which, with suitable dimensioning in terms of the mechanical prestressing effect in particular of the compression spring has a softer springing performance than when a compression spring is used on its own. However a softer springing performance advantageously results in an improved level of seating comfort. Furthermore, a softer springing characteristic for the seat according to the invention also affords the advantage of enhancing the operational or service life of the springing system and consequently the sprung seat frame in its entirety.

In accordance with a preferred feature of the invention, the correction spring is a tension spring which is disposed beneath the seat support means and connected between first and second mounting members, wherein one mounting member projects from one of said levers towards said base support means and the other mounting member projects from the second lever towards the base support means. In the non-loaded condition of the seat frame or seat support means, the tension spring is disposed in the region between the seat support means and the pivotal connection location between the levers, while in the condition of maximum loading on the sprung seat frame or seat support means, the spring is then disposed in the region between the pivotal connection location and the base support means. The two connecting members for the tension spring may project integrally away from the respectively associated levers.

It will be appreciated that it is possible for a plurality of tension springs to be arranged in mutually parallel relationship between the two mounting members on the respective levers.

In order to provide for a defined setting in respect of a desired springing characteristic on the part of the seat frame, a preferred feature of the invention provides that the compression spring and/or the correction spring is or are mechanically prestressed when the seat is in the non-loaded condition.

Further objects, features and advantages of the present invention will be apparent from the following description of a preferred embodiment thereof.

DESCRIPTION OF THE PREFERRED EMBODIMENT

Figure 1:
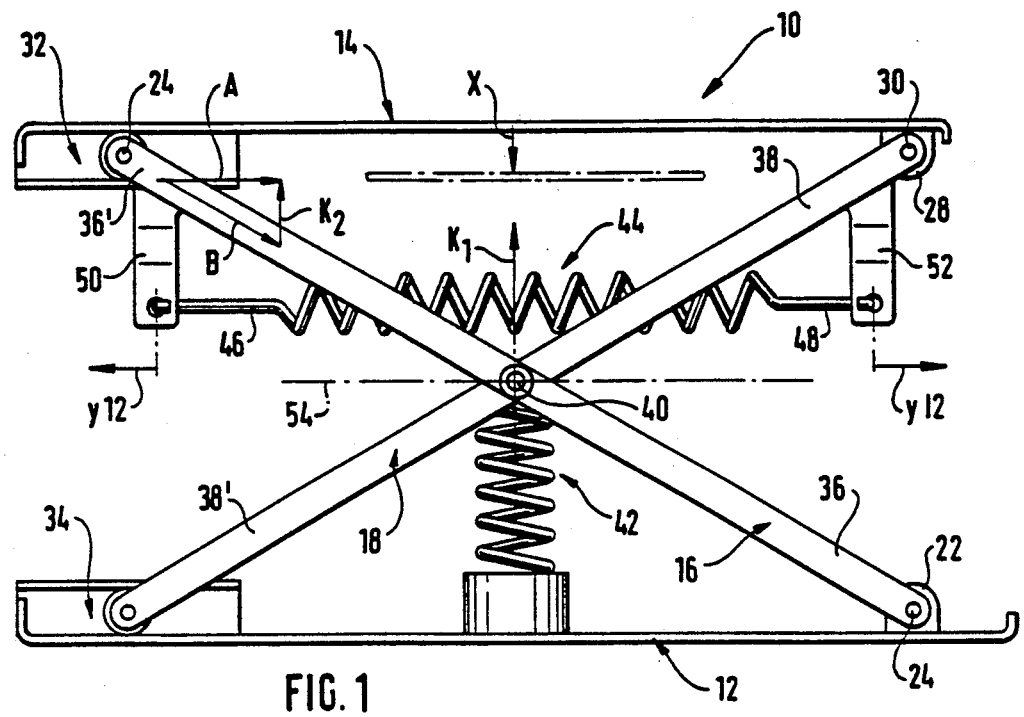
FIG. 1 is a view of a sprung seat frame according to the invention, seen from the side thereof.

Referring firstly to FIG. 1, diagrammatically shown as a side view therein is a sprung seat frame 10 in accordance with the invention comprising a base support means shown in the form of a base plate 12 which can be fixed to a suitable support surface such as the floor of a motor vehicle, and a seat support means shown in the form of a seat plate 14 for receiving for example a seat squab upholstery portion for the seat. The base plate 12 and the seat plate 14 are arranged at least approximately parallel to each other in the illustrated construction.

The seat frame further includes first and second levers 16 and 18 which interconnect the seat plate 14 and the base plate 12, in a scissor-like frame configuration. The seat desirably comprises, between the base plate 12 and the seat plate 14, a pair of scissor structures formed by levers 16 and 18, with the scissor structures being spaced from each other in the transverse direction of the seat. The lever 16 is pivotally connected by its one end portion 36, being the lower end portion in FIG. 1, to the base plate 12. For that purpose, the base plate 12 has a upwardly projecting plate portion 22. A connecting shaft or spindle 24 extends through the plate portion 22 and the first end portion 36 of the lever 16, to provide the pivotal connection for the latter. The lever 18 is similarly pivotally connected by its first end portion 38 to the seat plate 14. That connection is provided by a plate portion 28 projecting downwardly from the underside of the seat plate 14, and a connecting shaft or spindle 30.

The seat plate 14 and the base plate 12 are provided with respective guide devices indicated generally at 32 and 34 respectively. The second end portion 36' of the lever 16 is linearly movably guided in the guide device 32 while the second end portion 38' of the second lever 18 is similarly linearly movably guided in the other guide device 34.

The levers 16 and 18 are pivotally connected together in a central region thereof by means of a pivotal connection location formed by a connecting shaft or spindle 40.

Reference numeral 42 in FIG. 1 identifies a compression spring forming part of the seat springing system, operatively disposed between the base plate 12 and the levers 16 and 18. As the amount of space available between the base plate 12 and the part of the levers 16 and 18 which is engaged by the spring 42 is relatively small, the spring 42 is of necessity of a compact configuration and it therefore normally has a high spring constant or rate, which would mean that the seat frame 10 has a hard springing characteristic. To counteract that the seat frame 10 in accordance with the invention includes a correction spring as indicated at 44. The correction spring 44 is a coil tension spring which has its first and second end portions 44 and 46 connected to respective ones of mounting members 50 and 52. The mounting member 50 is carried on or fixed to the first end portion 36' of the lever 16 while the mounting member 52 is similarly carried on or fixed to the first end portion 38 of the other lever 18. The two mounting members 50 and 52 are of an elongate configuration and are oriented downwardly towards the base plate 12 so that the correction spring 44 which is thus disposed at least approximately parallel to the seat plate 14 and the base plate 12 is disposed above the pivotal connection location 40 and in the vicinity thereof, when the seat frame 10 is in the non-loaded condition as shown in FIG. 1.

If a load is applied to the seat plate 14 in a downward direction, so that the seat plate 14 then moves downwardly towards the base plate 12, as indicated by the arrow x in FIG. 1, the compression spring 42 is compressed and applies a corresponding vertical force indicated by $K_1$ to the lever structure. At the same time, a force component as indicated at A in FIG. 1 takes effect at each of the mutually remote end portions 46 and 48 of the tension correction spring 44.** The component A can be broken down into a force component indicated at B in FIG. 1, acting in the direction of the corresponding lever 16 or 18, and a vertical force component $K_2$ which is parallel to the component $K_1$.

** Said force A results in an extension of the tension correction spring 44 i.e. its end portions 46, 48 about an amount y/2.

Figure 2:
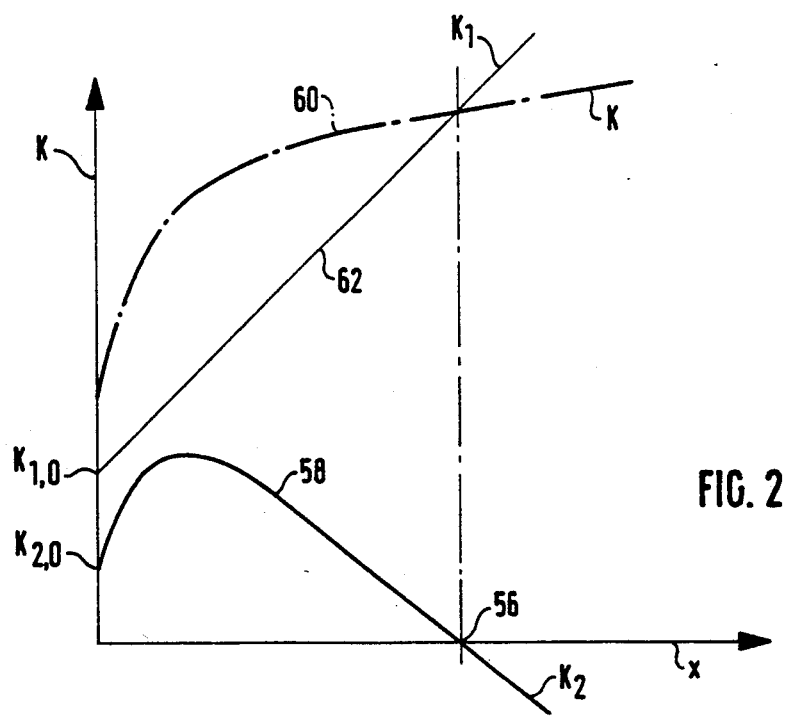
FIG. 2 is a graph showing the dependency of the spring force of the springing system of the seat frame on the movement of the seat support plate towards the base support plate of the seat frame.

It will be seen from FIG. 2 that in the non-loaded condition of the seat frame 10, the compression spring 42 of the seat springing system is mechanically prestressed, as indicated by the force $K_{1,0}$. The correction spring 44 is mechanically prestressed at a value indicated at $K_{2,0}$. If the seat plate 14 is put under load and is thus urged downwardly towards the base plate 12, the spring force $K_1$ increases linearly with the value x representing the distance by which the seat plate 14 moves downwardly towards the base plate 12. When the seat plate 14 is urged downwardly in that way, the correction spring 14 is put under tension, which gives rise to a corresponding increase in the component A. When however the correction spring 44 is disposed precisely in alignment with the connecting shaft or spindle 40 constituting the pivotal connection location between the levers 16 and 18, which is indicated in FIG. 1 by the thin broken line 54, then the components A and B are in alignment with each other and the vertical component $K_2$ becomes zero in that position, as indicated by the point 56 in FIG. 2. If the seat plate 14 is urged still further downwardly towards the base plate 12, the correction spring 44 moves into a position beneath the pivotal connection location between the levers 16 and 18 so that the component $K_2$ is then no longer directed upwardly but is now directed downwardly and acts in opposition to the force component $K_1$ of the compression spring 2. That component $K_2$ of the force of the correction spring 44 is indicated by the line 58 in FIG. 2. The co-operation of the correction spring 44 with the compression spring 42 is shown in FIG. 2 by the dash-dotted line 60.

It will be clearly apparent from FIG. 2 therefore that the sprung seat frame structure according to the invention has a springing system with springing characteristics which are softer than those of the compression spring 42, if the springing line 60 of the springing system of the seat frame according to the invention is compared to the springing characteristic of the compression spring 42 alone, which is indicated by the line 62.

It will be appreciated that the above-described seat frame construction has been set forth solely by way of example and illustration of the principles of the present invention and that various modifications and alterations may be made therein without thereby departing from the spirit and scope of the invention.

What is claimed is:

1. A sprung seat frame for a seat comprising a base support means; a seat support means; first and second levers disposed between the seat support means and the base support and pivotally connected together in their central region in a scissor-like frame configuration, each lever having first and second end portions; first means connecting the first end portions of the levers to the base support means; second means connecting the second end portions of the levers to the seat support means, one of said first and second connecting means being a pivotal connection between the associated lever end portions and the respective support means, and the other of said first and second connecting means comprising a linear motion guide means adapted to provide for linear motion of the associated lever end portions relative to the respective support means; a springing system including a compression spring disposed between the scissor-like frame configuration and the base support means for springing the seat frame; a correction spring operatively disposed between the levers in at least approximately parallel relationship to the base and seat support means such that upon movement of the seat support means relative to the base support means, the correction spring is displaceable relative to the pivotal connection location between the levers, whereby there is a change in the spring force component of the correction spring, said component being parallel to the spring force of the compression spring, and consequently providing a change in the spring rate of the springing system of the seat frame; first and second mounting means projecting from said first and second levers, respectively, toward said base support means, and wherein said correction spring is a tension spring disposed beneath the seat support means between said first and second mounting means, such that in a substantially non-loaded condition of said seat frame, said tension spring is between said seat support means and said pivotal connection location, while in the condition of maximum loading on said seat frame said tension spring is between said base support means and said pivotal connection location.

2. A seat frame as set forth in claim 1 wherein said change in said component of the spring force of the correction spring is a change in magnitude.

3. A seat frame as set forth in claim 1 wherein said change in said component of the spring force of the correction spring includes a change in direction.

4. A seat frame as set forth in claim 1 wherein said change in said spring rate is a reduction.

5. A seat frame as set forth in claim 1 wherein said compression spring is mechanically prestressed in the non-loaded condition of the seat frame.

6. A seat frame as set forth in claim 1 wherein said correction spring is mechanically prestressed in the non-loaded condition of the seat frame.

* * * * *